US012269064B2

(12) United States Patent
Merzhaeuser

(10) Patent No.: US 12,269,064 B2
(45) Date of Patent: Apr. 8, 2025

(54) DEVICE FOR GENERATING PERCUSSIVE PULSES OR VIBRATIONS FOR A CONSTRUCTION MACHINE

(71) Applicant: EURODRILL GmbH, Drolshagen (DE)

(72) Inventor: Markus Merzhaeuser, Drolshagen-Bleche (DE)

(73) Assignee: EURODRILL GmbH, Drolshagen (DE)

( * ) Notice: Subject to any disclaimer, the term of this patent is extended or adjusted under 35 U.S.C. 154(b) by 0 days.

(21) Appl. No.: 17/525,710

(22) Filed: Nov. 12, 2021

(65) Prior Publication Data

US 2022/0152655 A1 May 19, 2022

(30) Foreign Application Priority Data

Nov. 13, 2020 (EP) .................................... 20207463

(51) Int. Cl.
*B06B 1/18* (2006.01)
*E02D 7/18* (2006.01)
(Continued)

(52) U.S. Cl.
CPC ................ *B06B 1/183* (2013.01); *B06B 1/18* (2013.01); *E02D 7/18* (2013.01); *E21B 1/26* (2020.05);
(Continued)

(58) Field of Classification Search
CPC .. B06B 1/183; B06B 1/18; B06B 3/02; B06B 2201/73; F15B 13/02; E02F 7/10;
(Continued)

(56) References Cited

U.S. PATENT DOCUMENTS 3,282,372 A * 11/1966 Brown .................. G01V 1/145 367/182
3,363,720 A * 1/1968 Mifsud .................. G01V 1/135 181/114
(Continued)

FOREIGN PATENT DOCUMENTS

CN 104 265 715 B 2/2017
DE 199 62 887 A1 6/2001
(Continued)

OTHER PUBLICATIONS

Search Report issued by the the Intellectual Property Office of Singapore in Singaporean Application No. 10202111948Q which is related to U.S. Appl. No. 17/525,710; Date of completion of the search: Dec. 23, 2022.
(Continued)

*Primary Examiner* — Dustin T Nguyen
(74) *Attorney, Agent, or Firm* — Studebaker Brackett PLLC

(57) ABSTRACT

The invention relates to a device and a method for generating percussive pulses or vibrations for a construction machine, with a housing, a piston which is reversibly reciprocable in a working space in the housing between a first reversal point and a second reversal point, a pressure fluid supply, through which pressure fluid can in each case be led into and out of the working space in the region of the first reversal point and the second reversal point, wherein the piston can be set into the reversible movement in order to generate the percussive pulses or vibrations, at least one controllable valve, through which the pressure fluid can be led into and/or out of the working space, and a control unit which is connected to the at least one controllable valve, wherein by the control unit the movement of the piston in the working space can be controlled and changed. According to the invention provision is made in that the control unit is
(Continued)

Figure 1:
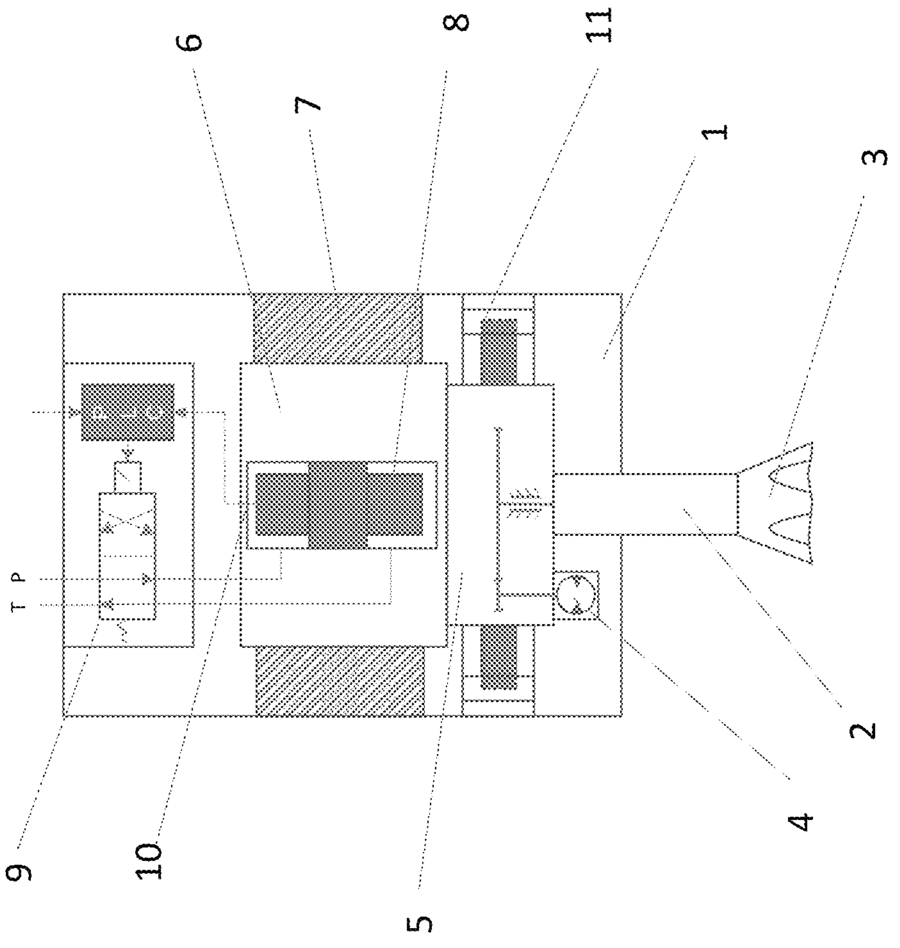

designed to move the piston at a frequency that corresponds to a resonance frequency of an overall arrangement comprising the piston and the pressure fluid.

10 Claims, 3 Drawing Sheets

(51) Int. Cl.
*E21B 1/26* (2006.01)
*F15B 13/02* (2006.01)
*E02D 3/046* (2006.01)
*E02D 7/10* (2006.01)

(52) U.S. Cl.
CPC .............. *F15B 13/02* (2013.01); *E02D 3/046* (2013.01); *E02D 7/10* (2013.01)

(58) Field of Classification Search
CPC ..... E02F 7/18; E02F 7/06; E02F 5/326; E02F 5/30; E21B 1/04; E21B 1/26; E21B 1/28; E21B 6/04; E02D 7/18; E02D 7/10; E02D 7/06; E02D 3/046
See application file for complete search history.

(56) References Cited

U.S. PATENT DOCUMENTS

| | | | | |
|---|---|---|---|---|
| 3,664,179 A * | 5/1972 | Danko | G01N 3/36 | 73/575 |
| 3,990,522 A * | 11/1976 | Pyles | E21B 21/16 | 173/78 |
| 4,026,193 A | 5/1977 | Olmsted | | |
| 4,031,812 A | 6/1977 | Koshelev | | |
| 4,403,511 A * | 9/1983 | Shibano | G01N 3/36 | 73/665 |
| 4,428,238 A * | 1/1984 | Tauscher | B06B 1/183 | 137/625.65 |
| 4,645,016 A | 2/1987 | Barnes | | |
| 4,674,571 A * | 6/1987 | Vogen | E21B 31/005 | 166/249 |
| 5,090,485 A * | 2/1992 | Pomonik | E02D 7/18 | 173/1 |
| 6,742,960 B2 * | 6/2004 | Corcoran | E01C 19/286 | 404/133.05 |
| 10,730,075 B2 * | 8/2020 | Merzhaeuser | B06B 1/18 | |
| 2006/0254270 A1 * | 11/2006 | Tanaka | F02G 1/045 | 60/517 |
| 2007/0017672 A1 * | 1/2007 | Kayadarma | E21B 47/008 | 166/250.01 |
| 2013/0272797 A1 * | 10/2013 | Bies | B06B 1/183 | 405/232 |
| 2018/0361432 A1 | 12/2018 | Merzhaeuser et al. | | |
| 2020/0316646 A1 | 10/2020 | Janes et al. | | |

FOREIGN PATENT DOCUMENTS

| | | | |
|---|---|---|---|
| DE | 10 2015 212 809 | A1 | 1/2017 |
| EP | 1 617 156 | A1 | 1/2006 |
| EP | 3 417 951 | A1 | 12/2018 |
| GB | 920158 | A | 3/1963 |
| GB | 2220988 | A | 1/1990 |
| JP | S59-098928 | A | 6/1984 |
| JP | 2018-526231 | A | 9/2018 |
| JP | 2019-000846 | A | 1/2019 |
| KR | 10-2005-0111635 | A | 11/2005 |
| KR | 10-2090038 | B1 | 4/2020 |
| NL | 7 807 775 | A | 1/1979 |

OTHER PUBLICATIONS

Written Opinion issued by the Intellectual Property Office of Singapore in Singaporean Application No. 10202111948Q which is related to U.S. Appl. No. 17/525,710; Date of Written Opinion: Dec. 28, 2022.
An Office Action mailed by the Korean Intellectual Property Office on May 30, 2023, which corresponds to Korean Patent Application No. 10-2021-0154500 and is related to U.S. Appl. No. 17/525,710; with English language translation.
An Office Action mailed by China National Intellectual Property Administration on Dec. 28, 2023, which corresponds to Chinese Patent Application No. 202111338572.7 and is related to U.S. Appl. No. 17/525,710; with English language translation.
An Office Action; "Notice of Reasons for Refusal," mailed by the Japanese Patent Office on Jan. 9, 2024, which corresponds to Japanese Patent Application No. 2021-179248 and is related to U.S. Appl. No. 17/525,710; with English language translation.
An Office Action mailed by the Korean Intellectual Property Office on Sep. 18, 2023, which corresponds to Korean Patent Application No. 10-2021-0154500 and is related to U.S. Appl. No. 17/525,710; with English language translation.

* cited by examiner

DEVICE FOR GENERATING PERCUSSIVE PULSES OR VIBRATIONS FOR A CONSTRUCTION MACHINE

The invention relates to a device for generating percussive pulses or vibrations for a construction machine, with a housing, a piston which is reversibly reciprocable in a working space in the housing between a first reversal point and a second reversal point, and a pressure fluid supply, through which pressure fluid can in each case be led into and out of the working space in the region of the first reversal point and the second reversal point, wherein the piston can be set into the reversible movement in order to generate the percussive pulses or vibrations, with at least one controllable valve, through which the pressure fluid can be led into and/or out of the working space, and a control unit which is connected to the at least one controllable valve, wherein by the control unit the movement of the piston in the working space can be controlled and changed, in accordance with the preamble of claim 1.

The invention further relates to a method for generating percussive pulses or vibrations for a construction machine, in which a piston is reversibly reciprocated in a working space in a housing between a first reversal point and a second reversal point, wherein, for the purpose of generating the percussive pulses or vibrations, the piston is set into a reversible movement by means of a pressure fluid and the pressure fluid is led into and out of the working space in the region of the first reversal point and the second reversal point, wherein a control unit controls at least one controllable valve, through which pressure fluid is led into and/or out of the working space, and by the control unit the movement of the piston is controlled, in accordance with the preamble of claim 10.

A generic vibration generator is known from EP 3 417 951 A1. In this known vibration generator the working space in a housing is divided by a working piston into two pressure chambers. Via an inlet and an outlet the two pressure chambers are selectively supplied with or discharged from a pressure fluid in an alternating manner so that the working piston moves reversibly and generates a vibration. The timed supply and discharge of pressure fluid in the individual pressure chambers takes place via a controllable valve and a complex arrangement of ducts in the housing. Moreover, inside the working piston a measuring means is arranged, by means of which a precise determination of position of the working piston in the working space and thus with respect to the housing is carried out. By means of a control means both the opening and/or closing times of the controllable valve and also further parameters for the pressure fluid supply can be set. By changing the parameters via this control means it is, in particular, possible to vary both the frequency and the stroke of the working piston in the housing. In a program memory different parameters can be stored that generate a selective actuation of the vibration generator so that for the work application optimally adapted frequency and stroke length can be chosen for the vibration generator.

In known vibration generators it is, in fact, possible to change the frequency and the stroke to a limited extent in order to set the vibration parameters suitable for the case of application. However, for the general ascertainment of the vibration parameters and for the setting of the vibrating system the mass of the vibrating piston was primarily drawn upon. A suitable frequency was estimated in particular on the basis of the piston mass.

Further mechanical control means in vibration generators can, for example, also be taken from GB-A-920,158, U.S. Pat. No. 4,026,193 or 4,031,812. All these known devices have a working piston and a control piston which, depending on the respective position in the housing, open or close certain ducts, whereby a selective alternating supply of the two opposite pressure chambers is brought about to move the working piston.

Devices of such type are time-consuming and cost-intensive in production. Moreover, due to the duct layout a certain vibration or percussion behavior of the piston is predefined at a predetermined pressure level. A change of the vibration frequency and the percussion energy are only possible to a very limited extent and in some cases require laborious mechanical reworking.

The invention is based on the object to provide a device and a method for generating percussive pulses or vibrations, with which a particularly efficient percussion or vibration behavior can be achieved.

The object is achieved on the one hand by a device having the features of claim 1 and on the other hand by a method having the features of claim 10. Preferred embodiments of the invention are stated in the dependent claims.

The device according to the invention is characterized in that the control unit is designed to move the piston at a frequency that corresponds to a resonance frequency of an overall arrangement comprising the piston and the pressure fluid. It is a finding of the invention that the overall arrangement of the device for generating percussive pulses and/or vibrations depends not only on the characteristics of the piston, such as its diameter and its mass, but to a decisive extent also on further parameters influencing the pressure fluid, preferably the pressures arising, the line cross-sections, line lengths, line shapes and surfaces as well as the switching times and the shape of the valve slide with its control edges and the valve slide arrangement in the housing of the control valve. These further parameters can have a decisive influence on the resonance frequency and the related piston stroke and thus on the force transmitted by the device according to the invention or the transmitted percussive pulse.

A basic idea of the invention resides in the fact that the now possible variable actuation of the piston, i.e. the vibration and/or percussive pulse generator, is improved in such a way that its pressurization with pressure fluid takes place with parameters adapted to the system and the desired application so as to enable e.g. an improved penetration of the tool attached to the vibration and percussive pulse generator into different grounds for example. By ascertaining the resonance parameters for the overall arrangement comprising the piston and the pressure fluid it is on the one hand possible to ascertain the suitable resonance frequency and the resonance stroke and, on the other hand, due to the possible variable actuation of the vibration generator a dynamic adaptation of the parameters can also take place during operation in order to accommodate changes in the process. For example in earth drilling methods these changes can be caused by alterations in the earth or rock layers to be penetrated. In addition, various ancillary conditions can also have an influence on the resonance frequency, such as wear and tear, aging, change in temperature and viscosity of the pressure fluid etc.

Hence, in the device according to the invention the now possible dynamic adaptation of the parameters can take place in real time during operation and due to the permanent detection of the actual vibration the resonance frequency can virtually be optimized in a control circuit in order to achieve an improved vibration of the piston and therefore an increased force and/or pulse generation. As a result, it is possible to create a versatile vibration circuit that allows a very wide range of applications of the device in a construction machine.

For the device according to the invention basically all suitable controllable valves can be employed. According to a further development of the invention it is particularly expedient for the valve to be an electromagnetic valve. The valve body can be adjusted by an electromagnetic arrangement between an open and a closed position. It is also possible to set intermediate positions so that the quantity of pressure fluid supplied to the working space can be set. Basically, any type of pressure fluid can be provided, in which case hydraulic oil is preferably used.

A preferred embodiment variant of the invention resides in the fact that a measuring means for determining a position of the piston in the working space is provided. With regard to the measuring means all usable sensors for length or position measurement can be employed that operate, in particular, optically, capacitively, inductively, magnetically or in another way.

According to an embodiment of the invention it is especially advantageous for the measuring means to have a linear sensor. This is particularly appropriate if the piston is moved linearly in the housing between the two reversal points.

Basically, the piston can be moved reversibly in the housing such that the piston does not contact the wall of the housing with its two front faces. In this way, the device can be employed as a so-called vibration generator. An advantageous embodiment of the invention resides in the fact that on at least one reversal point a percussion surface is arranged, onto which the piston strikes specifically in order to generate a percussive pulse. Basically, a percussion surface can be arranged on both opposite front faces of the piston on the housing. By preference, however, only a single percussion surface is present so that specific percussive pulses can be generated as desired for percussion drilling for example.

According to another preferred variant the overall arrangement comprises the housing. In this way, further factors and parameters influencing the vibration circuit can be represented, such as the cross sections and roughnesses of the ducts for leading the pressure fluid into and out of the working space as well as possible elbow losses of these ducts in the housing.

According to a further variant of the invention it is preferred that by the control unit a frequency and/or a stroke of the piston can be set and adjusted. To change the frequency in particular the opening and closing times and, where appropriate, the supply of hydraulic energy can be set by the control unit. In addition, the stroke of the piston can be achieved by changing the position of the two reversal points through a corresponding opening and closing of the controllable valves. For this purpose, the control unit preferably has an input interface, such as an input field. In addition, the control unit can be analogously operated directly through a customary machine control from an operating unit by an operator.

According to a further preferred embodiment of the invention the mass of the piston and/or the housing can be changed by mounting or removing adjustment weights. Especially the change of the piston and/or cylinder mass brings about a substantial change of the resonance frequencies when generating the vibrations or percussive pulses in the device. It is precisely the combination of a variable actuation of the pressure fluid by setting the piston reversal points and the mass of the piston or housing matched thereto that renders it possible to cover a wide range of applications with this system.

Another preferred embodiment variant of the invention can be seen in the fact that the control unit has a program memory, in which different control programs for controlling the piston can be stored. For instance specific control programs can be stored for particular application purposes. For example at the beginning of a program a high frequency with a small piston stroke can be provided, whereas in the program sequence the piston stroke then increases and a frequency decreases over time. Provision can be made for almost any number of different program sequences to control the piston with regard to frequency and stroke. For instance a program for quick advancement or a particularly gentle driving process can be provided. In addition, programs for specific types of soil can be stored. The control unit can preferably comprise an automatic program for determining the resonance frequency. In this, a frequency band starting from a starting frequency to a target frequency is run through on actuation of the piston, and in doing so the respective response frequencies of the device are detected via a vibration sensor. A maximum of the response frequency constitutes the resonance frequency.

The invention also comprises a construction machine which is characterized in that the previously described device for generating percussive pulses or vibrations is arranged on the construction machine. In particular, the construction machine can be provided for foundation engineering. However, the device can also be used in other construction machines with other tools, in which a penetration of a working edge or a material to be introduced into the ground is facilitated by applying a vibration by means of an oscillating mass. For example, this could be a digging shovel of an excavator as well as an attachment chisel for excavators.

According to an embodiment of the invention it is especially advantageous for the construction machine to be an earth drilling apparatus. If the device is provided for generating percussive pulses, percussion drilling can be carried out. This is particularly advantageous when penetrating harder layers of rock. Alternatively or additionally, the device can also be designed free from percussion contacts for the generating of vibrations. In an earth drilling apparatus with a drilling tool driven in a rotating manner so-called overburden drilling can thus be carried out in particular. In this, the rotational movement of the drilling tool is superimposed by a vibratory or oscillatory movement. Through superimposed vibrations a quasi-liquefaction of the ground can be achieved at least in the contact region with the drilling tool which leads to an improved drilling progress.

Another embodiment of the invention can be seen in the fact that the construction machine is a pile driver or a vibrator. Such pile drivers or vibrators can be used e.g. for the introduction of steel beams, piles or sheet piles which are driven into the ground through percussive pulses or vibrations.

The method according to the invention is characterized in that the at least one valve is controlled by the control unit such that the piston is moved at a frequency that corresponds to a resonance frequency of an overall arrangement comprising the piston and the pressure fluid.

This overall arrangement of the device for generating percussive pulses and/or vibrations not only represents the characteristics of the piston, such as its diameter and its mass, but furthermore comprises parameters influencing the vibration circuit, such as the applied pressures, the existing line cross-sections, line lengths, line shapes and surfaces as well as the switching times and the shape of the valve slide with its control edges and the valve slide arrangement in the housing of the control valve. These further parameters can have a decisive influence on the resonance frequency and the resulting piston stroke and thus on the force transmitted by the method according to the invention or the percussive pulse transmitted thereby.

According to a further development it is advantageous that the position of the piston is detected by way of a measuring means and that depending on the detected position of the piston a control unit controls at least one controllable valve, through which pressure fluid is led into and/or out of the working space, wherein by the control unit the movement of the piston is controlled.

The method according to the invention can be carried out, in particular, with the previously described device. The advantages described beforehand are achieved thereby.

Figure 2:
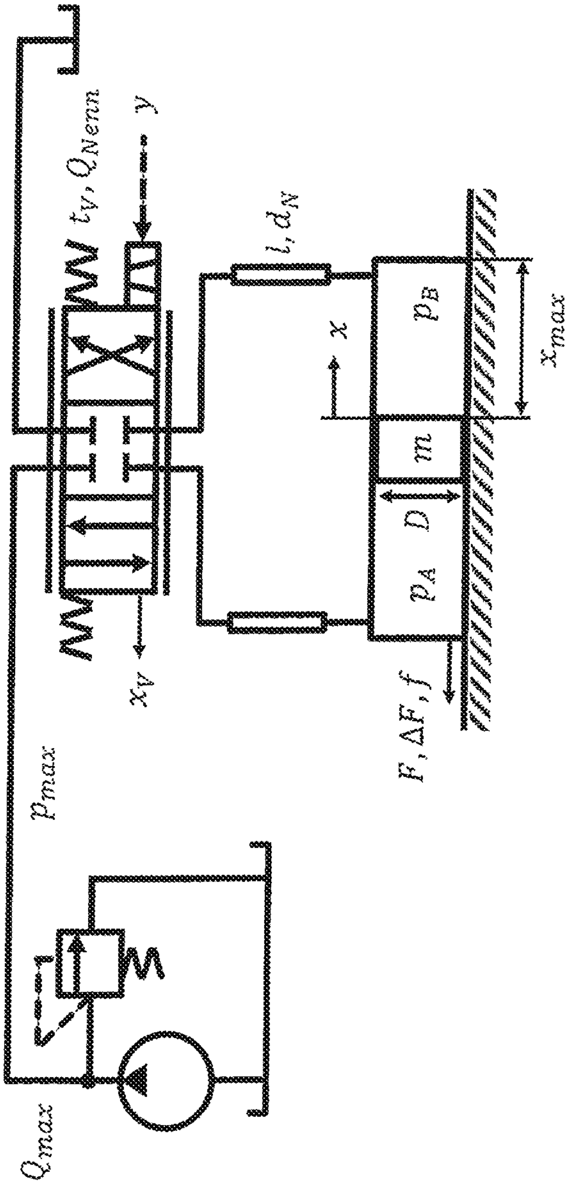

The invention is described further hereinafter by way of preferred embodiments illustrated schematically in the accompanying drawings, wherein show:

FIG. 1: a schematic cross-sectional view of a device according to the invention;

FIG. 2: a circuit diagram of a device according to the invention; and

Figure 3:
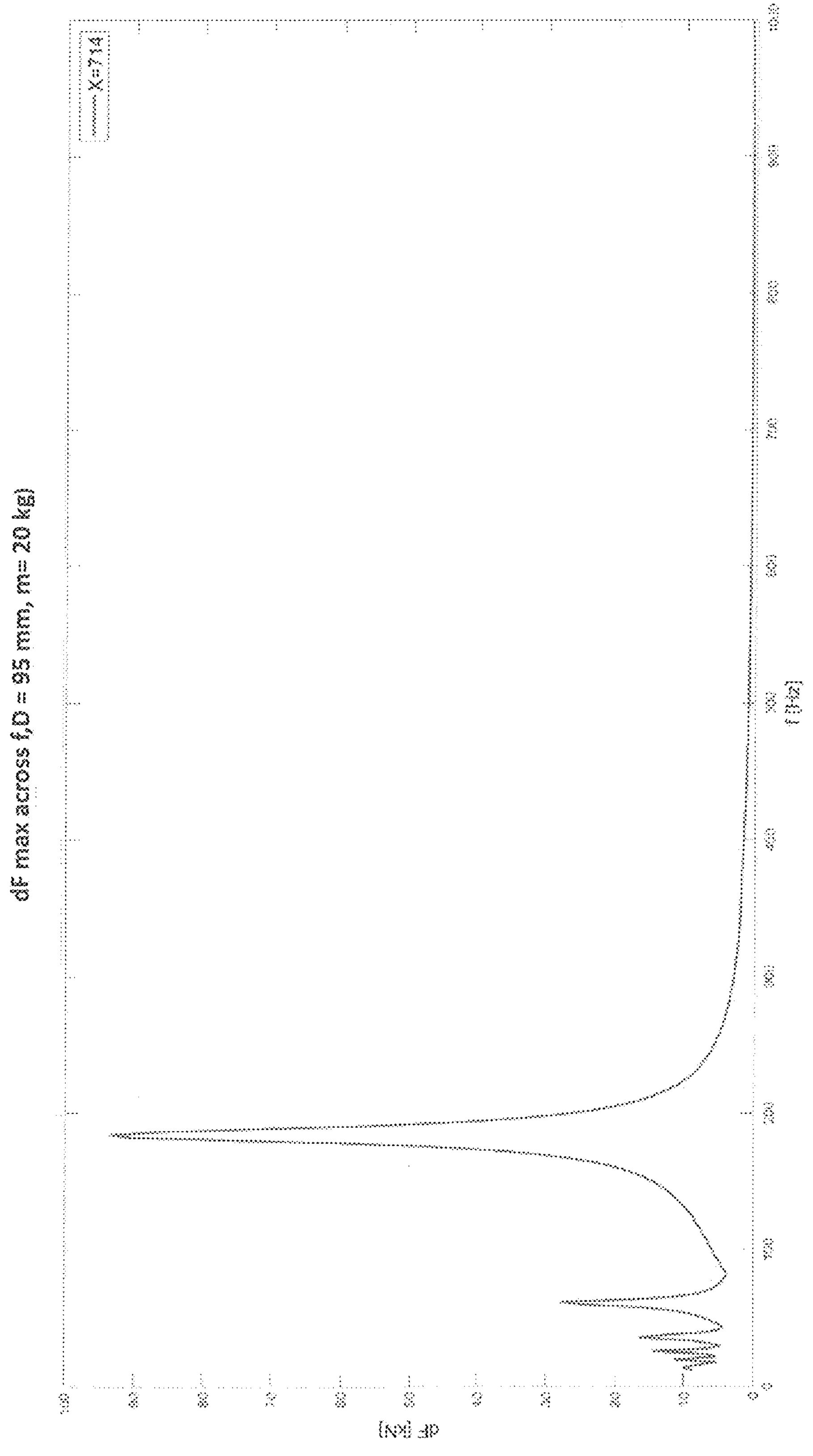

FIG. 3: a frequency diagram of a device according to the invention.

FIG. 1 shows the principle depiction of a drill drive that is equipped with a vibration or percussive pulse generator according to the invention. Illustrated here is a housing 1 that comprises all functional components. From this housing projects the drill rod 2 that carries the drill head 3 at its distal end. By means of a hydraulic motor 4 the drill rod 2 is set via a planetary gear 5 into rotational movement about the axis of the drill rod 2. A drilling tool is arranged on the drill head 3. Through rotational movement of the drill head 3 the cutting edge of the drilling tool is able to strip cuttings in the borehole. The thickness of the cuttings depends on the force applied in the axial direction. To generate an alternating axial vibratory force a vibration generator 6 that substantially corresponds to the vibration or percussive pulse generator according to the invention is mounted on the planetary gear 5. The vibration generator 6 is supported in a rubber spring 7 which decouples the generated vibration from the housing. In addition to the oscillation/vibration generator 6 the vibrating and therefore moved masses of the drill drive comprise the drill head 3, the drill rod 2, the planetary gear 5 and the hydraulic motor 4 which are to this end supported in an axial guide 11. Alternatively, the gear 5 can also be operated such that it is decoupled from the vibration cell or vibration generator 6. In this case, the generated vibration can, by way of example, be transmitted via a shaft, which is guided through an output shaft designed as a hollow shaft, directly to the drill rod and thus the drill head. The rotational movement generated by the gear can in this case be transmitted via a toothing or any tooth profile, which decouples the generated axial vibration from the gear, from the hollow shaft into the drill rod and thus to the drill head. Alternatively, it is also possible that the shaft transmits the rotational movement and a hollow shaft the generated vibration.

To generate the vibration in the vibration generator 6 this comprises a vibration cylinder or rather a vibratory piston 8, which is pressurized by a pressure fluid in an alternating manner in pressure chambers located on both sides of the vibratory piston 8. The pressure fluid is provided in a pressure fluid line P and applied in an alternating manner by means of a shuttle valve 9 to the working chambers on both sides of the vibratory piston 8. The shuttle valve can be an electromagnetically operated 2/4 directional control valve for example. However, use can also be made of all other suitable valves, e.g. with rotating valve slides, proportional and/or servo valves. Via the shuttle valve 9 the chamber on the vibratory piston 8 which is non-pressurized in each case is alternatingly connected to a pressureless tank line T. As a result of this alternating pressurization of the vibratory piston 8 this is set into vibration and generates the axial force necessary for the advancement of the drill head 3. The frequency, at which the shuttle valve 9 is actuated by a PLC (=programmable logic controller) is transmitted to the vibratory piston 8 of the vibration generator 6. Via a symbolically indicated measuring transducer 10 the current position of the vibratory piston 8 can be detected and transmitted to the PLC. As variables derived therefrom the actual stroke and the frequency of the vibratory piston 8 can also be determined. Through this measurement value detection the current responses of the overall arrangement, comprising both the oscillating vibratory piston 8 and the pressurizing pressure fluid, can be detected e.g. if the frequency of the shuttle valve 9 is changed. In this way, a control circuit is obtained, through which the vibration generator 6 can be operated dynamically. The detection of the position of the vibratory piston and of the variables derived therefrom, such as piston stroke and frequency, takes place in real time in order to be able to realize a control circuit. The desired reversal points of the vibratory piston 8 can be adapted in almost any chosen way to achieve an improved advancement in the depicted drill drive.

In FIG. 2 a simplified circuit diagram of the hydraulic vibratory drive is illustrated. In this case, too, a piston having the mass m and located in a housing can be set into vibration by applying a working pressure $p_{max}$. Shown symbolically here is an electromagnetically controlled 3/4 directional control valve for alternating pressurization. The pressure fluid supply takes place via a fixed displacement pump with pressure control valve. The parameters of the overall arrangement according to the invention are illustrated schematically here by the mass m and the diameter D of the piston as well as by the length l and the diameter $d_N$ of the supply lines of the pressure fluid.

Finally, in FIG. 3 the frequency response of an overall arrangement on excitation of a vibratory drive according to the invention is shown. The exemplary piston mass of 20 kg with a piston diameter D of 95 mm is excited by a fluid pressure $p_{max}$. In this case, the excitation of the vibratory drive was effected in an exemplary manner in a frequency range of 0 to 1000 Hz. Clearly evident is a force maximum deltaF (at the level of approx. 95 kN) at a resonance frequency of approximately 180 Hz which corresponds to a natural frequency of the overall arrangement comprising vibrating piston and pressure fluid. Due to the dynamic and variable alternating pressurization in a control circuit the preferred parameters for the vibration and pulse generator according to the invention can be ascertained in a simple way and these can be adapted promptly in case of changing ancillary conditions. Consequently, the vibration or pulse generator according to the invention enables e.g. an improved penetration into ground of construction machine tools, such as drills, chisels, ripper teeth etc., coupled to the said generator.

The invention claimed is:

1. A device for generating percussive pulses or vibrations for a construction machine, with a housing, a vibration generator disposed in a working space in the housing, the vibration generator including a piston configured to reversibly reciprocate in the working space between a first reversal point and a second reversal point, a pressure fluid supply, through which pressure fluid can in each case be led into and out of the working space in the region of the first reversal point and the second reversal point, wherein the piston can be set into the reversible movement in order to generate the percussive pulses or vibrations, at least one controllable valve, through which the pressure fluid can be led into and/or out of the working space, and a control unit which is connected to the at least one controllable valve, wherein by the control unit the movement of the piston in the working space can be controlled and changed, wherein the control unit is designed to move the piston at a frequency that corresponds to a resonance frequency of an overall arrangement comprising the piston and the pressure fluid, the control unit comprises an automatic program for determining the resonance frequency, wherein a frequency band starting from a starting frequency to a target frequency is run through on actuation of the piston and, in doing so, respective response frequencies of the device are detected, wherein a maximum response frequency being detected constitutes the resonance frequency, the response frequencies are detected based on vibrations of the piston, the vibration generator is supported in the housing by a spring which decouples generated percussive pulses or vibrations from the housing, a transducer determines a position of the piston in the working space, and the transducer is movable within the housing.

2. The device according to claim 1, wherein the valve is an electromagnetic valve.

3. The device according to claim 1, wherein the transducer includes a linear sensor.

4. The device according to claim 1, wherein on at least one reversal point a percussion surface is arranged, onto which the piston strikes specifically to generate a percussive pulse.

5. The device according to claim 1, wherein the overall arrangement also comprises the housing.

6. The device according to claim 1, wherein the mass of the piston and/or the housing can be changed by mounting or removing adjustment weights.

7. A construction machine, wherein a device for generating percussive pulses or vibrations according to claim 1 is arranged.

8. A construction machine according to claim 7, wherein the construction machine comprises an earth drilling apparatus.

9. A construction machine according to claim 7, wherein the construction machine comprises a pile driver or a vibrator.

10. A method for generating the percussive pulses or vibrations for the construction machine, with the device according to claim 1, in which the piston is reversibly reciprocated in the working space between the first reversal point and the second reversal point, wherein, for the purpose of generating the percussive pulses or vibrations, the piston is set into the reversible movement by means of the pressure fluid and the pressure fluid is led into and out of the working space in the region of the first reversal point and the second reversal point, wherein the control unit controls the at least one controllable valve, through which the pressure fluid is led into and/or out of the working space, and by the control unit the movement of the piston is controlled, wherein the at least one controllable valve is controlled by the control unit such that the piston is moved at the frequency that corresponds to the resonance frequency of the overall arrangement comprising the piston and the pressure fluid, the resonance frequency determined at the working space.

* * * * *